US012427908B2

(12) United States Patent
Björnetun

(10) Patent No.: US 12,427,908 B2
(45) Date of Patent: Sep. 30, 2025

(54) ENERGY ABSORBING MEMBER

(71) Applicant: MIM CONSTRUCTION AB, Frändefors (SE)

(72) Inventor: Mats Björnetun, Frändefors (SE)

(73) Assignee: MIM CONSTRUCTION AB, Trollhattan (SE)

( * ) Notice: Subject to any disclaimer, the term of this patent is extended or adjusted under 35 U.S.C. 154(b) by 462 days.

(21) Appl. No.: 17/924,734

(22) PCT Filed: May 24, 2021

(86) PCT No.: PCT/EP2021/063769
§ 371 (c)(1),
(2) Date: Nov. 11, 2022

(87) PCT Pub. No.: WO2021/239668
PCT Pub. Date: Dec. 2, 2021

(65) Prior Publication Data
US 2023/0182635 A1    Jun. 15, 2023

(30) Foreign Application Priority Data
May 25, 2020   (SE) .................................. 2050599-6

(51) Int. Cl.
*B60P 7/00*   (2006.01)
*B60P 7/16*   (2006.01)
*B60R 9/04*   (2006.01)

(52) U.S. Cl.
CPC . *B60P 7/16* (2013.01); *B60R 9/04* (2013.01)

(58) Field of Classification Search
CPC ..................................... B60P 7/16; B60R 9/04
See application file for complete search history.

(56) References Cited

U.S. PATENT DOCUMENTS 9,382,008 B2 * 7/2016 Fornecker .............. B64D 11/06
2009/0267390 A1 * 10/2009 Honnorat ............. B60N 2/4242
297/216.16

(Continued)

FOREIGN PATENT DOCUMENTS

AU    2019 257 490    5/2020
WO    2010/000035    1/2010

(Continued)

OTHER PUBLICATIONS

International Search Report Issued in PCT/EP2021/063769, Jul. 16, 2021, pp. 1-5.

(Continued)

*Primary Examiner* — Steven O Douglas
(74) *Attorney, Agent, or Firm* — Jeffrey S. Melcher; Melcher Patent Law PLLC

(57) ABSTRACT

This invention relates to an energy absorbing member (3) for a load carrying, load pulling, load pushing or load stopping assembly or the like, wherein said energy absorbing member (3) includes first and second attachment devices (30, 31) and a shaped body member (35) extending in a longitudinal direction (C) between said first and second attachment devices (30, 31) arranged to enable a predetermined relative elongation ($\Delta L$) between said first and second attachment devices (30, 31) parallelly with said longitudinal direction (C) upon simultaneous absorption of energy reducing the risk of hazard in connection with sudden deceleration, wherein said absorbing member (3) includes a stabilizing control arrangement (36) that extends along said shaped body member (35) arranged to stabilize the said shaped body (35) in relation to forces not exceeding a first force level (F1) hindering relative movement between said attachment devices (30, 31) in at least one dimension.

21 Claims, 2 Drawing Sheets

(56) References Cited

U.S. PATENT DOCUMENTS

2022/0169169 A1* 6/2022 Björnetun ................. B60P 7/16
2023/0024078 A1* 1/2023 Björnsson ................. B60P 7/16

FOREIGN PATENT DOCUMENTS

| WO | 2010/121296 | 10/2010 |
| WO | 2015/143544 | 10/2015 |
| WO | 2016/176721 | 11/2016 |

OTHER PUBLICATIONS

Written Opinion Issued in PCT/EP2021/063769, Jul. 16, 2021, pp. 1-3.

* cited by examiner

ENERGY ABSORBING MEMBER

TECHNICAL FIELD

This invention relates to an energy absorbing member for a load carrying, load pulling, load pushing or load stopping assembly or the like, wherein said energy absorbing member includes first and second attachment devices and a shaped body member extending in a longitudinal direction between said first and second attachment devices arranged to enable a predetermined relative elongation between said first and second attachment devices) parallelly with said longitudinal direction upon simultaneous absorption of energy reducing the risk of hazard in connection with sudden deceleration.

BACKGROUND

There exist many situations where a load may cause damages upon sudden deceleration or vice versa that sudden deceleration causes damages on the load, e.g. when a vehicle is crashing. Due to the high energy that has been gained by the load due to the speed sudden deceleration may cause attachment members between the vehicle and the assembly carrying the load to break, e.g. disrupt, which may cause severe damages. One typical example that may be referred to is a car having a roof box carried on top of a roof rack.

Severe disasters have been caused by heavy loads on roof racks that in connection with sudden deceleration of vehicles, e.g. crash, have loosened from their attachments to the roof rack. For instance, roof boxes have been causing disasters in this manner. As is well known, roof boxes may enclose a very large volume and accordingly it is possible to put a lot of load into a roof box. In connection with a crash, or other sudden deceleration, there is a risk that the attachment members keeping the roof box in place on the roof rack may be over-strained and rupture. In such a situation the roof box will continue to travel at high speeds along an uncontrolled trajectory, thereby risking to destroy and/or injure objects and/or people within that trajectory.

From WO2008/076037 there is known an arrangement intended to minimize the above risk, which is based on a specifically designed attachment between a holder of a roof rack and a bracket attached onto the roof of the vehicle. However, such an arrangement does not eliminate or reduce the risk that at large impact the attachment devices keeping the load e.g. roof box, onto the roof rack may rupture.

From DE4028433 and DE102015113689 it is known to supplement a roof rack assembly with energy absorbing devices in order to reduce hazard upon sudden deceleration. However, these designs present some essential disadvantages. One major disadvantage is that the energy absorbing device is complicated to install and is of need of specifically designed inter-fitting details. Further, from US 2007262564 it is known to supplement a trailer hitch with an energy absorbing member, which presents some essential disadvantages, e.g. providing a relatively limited energy absorption and having a relatively bulky and complex design.

Further, from AU 2019257490, US 20180264297 and US 2013277519 there are known safety devices intended to be used by people working high up, e.g. on roofs, including energy absorbing members.

Finally, it is referred to WO2020/173721, which discloses an invention made by the applicant and which is herewith introduce by way reference.

SUMMARY OF THE INVENTION

It is an object of the invention to eliminate or at least reduce the above-mentioned problem which is achieved in accordance with a solution as defined in claim 1.

Thanks to the invention there is provided an energy absorbing means for a load carrying, load pulling, load pushing or load stopping assembly, or the like, which may eliminate disastrous consequences in connection with sudden decelerations, e.g. crashes, and which may easily be used in a flexible manner in various applications and easily maintained and exchanged.

In one application it may relate to a load carrying assembly on a vehicle carrying a load in the form of a roof box, or similar device, which will absorb energy in a controlled manner at impact which in turn will decrease the strain excerpted on, or applied to, the attachment devices between the load and the vehicle. Accordingly, the risk of rupture of any attachment device is thereby significantly reduced, which may save lives and eliminate or decrease possible damages.

In another application it may relate to a security arrangement for a load pulling assembly connected to a vehicle, wherein a security arrangement including an energy absorbing member according to the invention may eliminate a rupture of the coupling between the load pulling vehicle and the load that is pulled, e.g. in the form of a trailer and a vehicle arranged with a tow bar.

In another application according to the invention it may relate to a vehicle pushing a load wherein a security arrangement with an energy absorbing member according to the invention may eliminate rupture between a coupling between the pushing vehicle and the pushed load, e.g. a train pushing a wagon.

In another application it may relate to a vehicle in the form of a moveable device in a machine which is arranged with a load stop assembly, wherein security arrangement including an energy absorbing member according to the invention may eliminate rupture of the attachment between the ground and the stop member of the machine.

The basic principle of the solution according to the invention includes the use of an energy absorbing member including a stabilizing control arrangement, such that it will not allow any substantial relative movement between the attachment devices, i.e. at a force below a predetermined level. At a force above said predetermined level the stabilizing control arrangement will rupture and thereafter a soft deceleration is achieved by means of the energy absorbing member deforming, i.e. by being elongated, and wherein at least a portion of the energy will be transformed to permanent deformation of said energy absorbing member. In a preferred embodiment the energy absorbing member is made of a ductile material, e.g. a shaped body of metal to enable deformation parallelly with the longitudinal direction, i.e. enable prolongation in said longitudinal direction according to some examples.

Preferably the energy absorbing member may easily be replaced by a new member after having been elongated.

According to further aspects of the invention:

each transversal rib (370) and each longitudinal rib (360) extend from at least one hub part (380) that is positioned along said centre line (C), which may provide the advantage that a more controlled prolongation of the shaped body may be achieved.

The shaped body member (35) includes a plurality of U-shaped portions (35A-35D), wherein two neighbouring U-shaped portions (35A, 35B) will form at least one S-shaped part extending in in parallel with said longitudinal direction (C), more preferred a plurality of S-shaped parts connected to each other in parallel with said longitudinal direction (C), which provides an advantageous function of the shaped body.

the predetermined relative elongation comprises a maximal elongation ($\Delta L_{max}$) of said shaped body (35) from its nominal length ($L_0$) to a maximum length ($L_{max}$), wherein said maximal elongation ($\Delta L_{max}$) is at least 50%, preferably at least 100%, more preferred at least 150%, which provides the advantage that energy may be absorbed in a gentle manner, wherein preferably more than 50% of the energy being absorbed is ductile, i.e. in the form of permanent deformation of said energy absorbing member, said shaped body member (35) is flat shaped, which provides the advantage that the energy absorbing member may be easily produced and provided in a compact manner.

wherein the rupture force (RF) of said ribs (360, 370) is substantially smaller than said first force level (F1), preferably many times smaller than said first force level (F1), and preferably said ribs (360, 370) are made of the same material as the shaped body member (35) and that the largest cross sectional area (AR) of said longitudinally extending ribs (360) is smaller than the smallest cross sectional area (AS) of the shaped body (35), wherein preferably AS>2 AR, more preferred AS>10 AR.

there is arranged a curved transition zone at the periphery of said hub (380) extending between each transversal rib (370) and longitudinal rib (360), which also may provide the advantage that a more controlled prolongation of the shaped body may be achieved.

there are arranged a plurality of pairs of transversal ribs (370) connecting in between the longitudinally extending row of the longitudinal rib (360) and two neighbouring rows (35', 35") of the shaped body member (35), wherein there is arranged a plurality of hub parts (380) positioned along said centre line (C).

the length (l) of each transversal rib (370) is at least two times, preferably 3-12 times larger than the thickness (W) of the shaped body (35), which also may provide the advantage that a more controlled prolongation of the shaped body may be achieved, wherein preferably each transversal rib (370) has its outer end connected to a distal part (35d) of the shaped body (35).

the width (W2) of each transversal rib (370) is within the range of 0.5-2 times the width (W3) of said at least one longitudinally extending rib (360), which also may provide the advantage that a more controlled prolongation of the shaped body may be achieved, Further aspects and details of the invention will become apparent from the following detailed description.

BRIEF DESCRIPTION OF THE DRAWINGS

In the following the invention will be described in more detail with reference to the enclosed figures, wherein.

DETAILED DESCRIPTION

Figure 1:
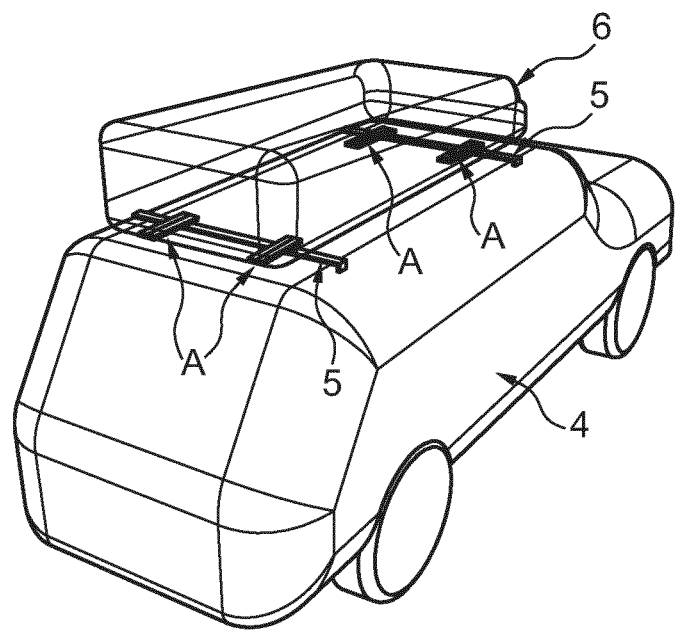
FIG. 1 shows a schematic view of a vehicle with a roof rack carrying a roof box, as an example of a security assembly having an energy absorbing member according to the invention, in a perspective view.

In FIG. 1 there is shown a schematic view of a vehicle 4 with a roof rack carrying a roof box 6, where four exemplary security arrangements A are arranged, and wherein each security arrangement A may have an energy absorbing member 3 according to the invention. In the shown example the security arrangements A are arranged between the roof box 6 and the roof rack, i.e. two on the front roof rack bar and two on the rear roof rack bar, forming a load carrying assembly 5. It is foreseen that instead of two, merely one single unit may be used at the front and rear, respectively and indeed even merely one single unit for all of it. Such exemplary security arrangements A are adapted to secure e.g. a roof box 6 to e.g. a roof rack, forming a load carrying assembly 5.

Generally, this kind of exemplary security arrangement A may be seen as an attachment arrangement A for attaching a device for carrying a load, e.g. a vehicle 4, e.g. attached to the roof or part of the roof of such a vehicle 4, e.g. a roof rack attached to roof rails of the vehicle, wherein the security arrangement A is arranged between roof rack and a load 6 carried by the roof rack. However, it may also fulfil the same basic function in other applications, as will become evident below. Hence, the above description, wherein an example is given, is merely intended to make it easier to understand how the basic function of invention may be used to achieve improved safety. The core of this invention relates to an improved design of an energy absorbing member 3 that may be used in the above described exemplary application.

The energy absorbing member 3 includes a shaped body 35, including a plurality of U-shaped portions 35A-35D connected to each other in a row forming the shaped body 35, wherein two neighbouring U-shaped portions 35A, 35B, etc will form an S. Hence, every second U-shaped portion 35A, 35C of a first kind have the curve part on a first side of a longitudinal centre line C and every second U-shaped portion 35B, 35D of a second kind have the curve part on a second side of a longitudinal centre line C. Preferably, the body 35 of the energy absorbing member 3 is flat shaped, which provides the advantage that it may be included in an assembly in a compact/hidden manner. Further it also provides the advantage that it may easily be produced by means of cutting or punching from a plate material, e.g. a metal plate.

When a sufficiently large force F1 is applied in the longitudinal direction the shaped body 35 will be straightened and elongated, and at least partially permanently deformed/prolonged, i.e. if the force exceeds a predetermined level. However, in the preferred embodiment the energy absorbing member 3, will be designed to withstand substantially higher forces, without any rupture, once the shaped body 35 has absorbed energy that has totally straightened the body 35, due to elastic and plastic deformation of the body 35 itself before rupture. Accordingly, a relatively soft deceleration will first be achieved during the straightening phase and thereafter a less soft deceleration will be achieved during the elastic and plastic deformation of the body 35 itself.

Preferably the shape of the energy absorbing member 3 is such that the relative movement may only reach a maximal prolongation $\Delta L_{max}\% = 100 \times (L_{max} - L_0)/L_0$ of said absorbing member 3 from its nominal length $L_0$, (e.g. 50-150 mm) to a maximum length $L_{max}$, wherein $\Delta L_{max}$ is at least 50%, preferably at least 100%, more preferred at least 150%, i.e. in some applications up to 500% or more. In many applications the meandering/multi-S shaped energy absorbing body 35 may preferably be prolonged from a nominal length $L_0$ to a maximal prolongation $\Delta L_{max}$ within a range of about 100-400%, e.g. if of about 100 mm i.e. a maximum length $L_{max}$ of about 200-500 mm.

In a modified embodiment (not shown) the meandering/multi-S shaped energy absorbing member 3 may have a body 35 shaped to have an increasing energy absorbing effect during prolongation, e.g. by means of having a continuously increasing cross-sectional area of the body, e.g. by means of having an increasing width W1 from one end to the other, i.e. the curve part of the first U-shaped portion 35A may then have a width that is less than the width of a second and/or third U-shaped portion 35 B. As a result, it will require a first level of force F1 (e.g. above 1000 N, or more preferred above 1400 N) to straighten out the first bend/curve part having the smallest width, a higher a second level (e.g. +10-30%) of force F2 to straighten out the second bend/curve part having a larger width, etc.

Further, as described in more detail below the shaped body 35 of the energy absorbing member 3 has a stabilizing control arrangement 36 including ribs 360 extending in the longitudinal direction, providing the advantage that during normal use (relatively low forces acting) of an assembly including a shaped body 35 according to the invention there will be no relative movement between the attachment points 30, 31 of the energy absorbing member 3, e.g. eliminating oscillations that may occur without the stabilizing control arrangement 36.

The design of a rib 360 is such that the rupture force RF is substantially smaller than F1, preferably many times smaller than F1, whereby disturbing oscillations or movements that may cause disadvantages during normal use may be eliminated, but full function still is obtained regarding the main function of energy absorbing member 3. The stabilizing control arrangement 36 will be of a material and have such a dimension that it breaks at a desired/predetermined level of force, where after the energy absorbing member 3 will start taking over the function to absorb energy. Preferably, the longitudinally extending ribs 360 are made of the same material as the shaped body 35, e.g. cut or punched out from a flat piece of metal, whereby the largest cross sectional area AR of said longitudinally extending ribs 360 is substantially smaller than the smallest cross sectional area AS of the shaped body 35, wherein preferably AS>2 AR, more preferred AS>10 AR, and wherein the areas AS, AR are proportional to the widths W2 and W3 respectively.

Figure 2:
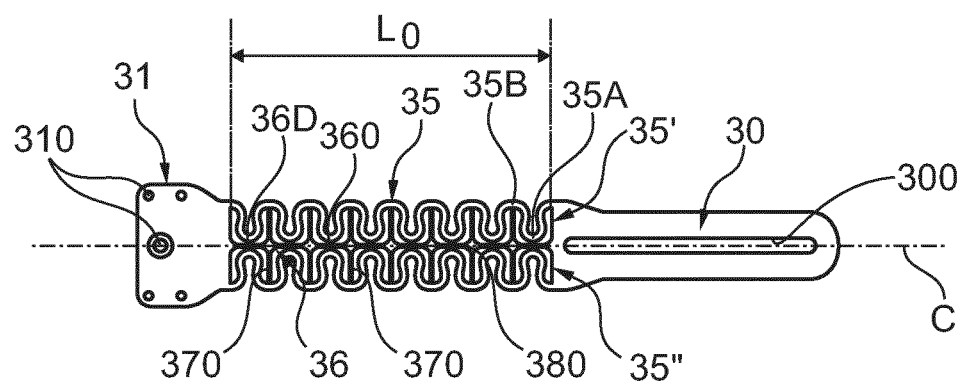
FIG. 2 shows a preferred embodiment of an energy absorbing member according to the invention in a view from above.

In FIG. 2 there is shown a view from above of a preferred embodiment of an energy absorbing member 3 according to the invention. The body 35 of the energy absorbing member 3 is preferably flat shaped and arranged between two attachment members 30, 31, preferably also flat shaped, e.g. in the form of plates 30, 31, with attachment passages 300, 310. There may be arranged two rows of parallelly extending body members 35', 35", which jointly will absorb energy as described above. Preferably, the two rows of parallelly extending body members 35', 35" are arranged mirror symmetric in relation to the longitudinal centre line C. Accordingly, each row 35',35" will include a plurality of consecutive U-shaped portions 35A, 35B, etc.

Further, there is shown in FIG. 2 that there is arranged a stabilizing control arrangement 36. The stabilizing control arrangement 36 as main feature comprises longitudinally extending ribs 360 (alternatively one long rib) providing basically the same kind of function as described above. The longitudinally extending ribs 360 (or rib) extend the whole distance between the attachment parts 30, 31 along the centre line C between the two body members 35', 35", preferably the longitudinally extending ribs 360 (or rib) extend in between the two rows 35', 35" without contacting any part of rows, i.e. without contact with any part of the most centrally positioned part 35i of any U-shaped portion 35A, 35B, but in a space formed between the two rows 35', 35".

Furthermore, there may also be provided transversally extending ribs 370, to achieve further stability. Hence, the transversally extending ribs 370 may provide for increased stability during normal use, i.e. during use that does not exceed the force level (e.g. 700N) that will start to deform any of the ribs 360, 370. Together with the longitudinally extending ribs 360 (or rib) the transversally extending ribs 370 will provide a stabilizing structure that may keep the energy absorbing body 35 form stable in regard to forces from any direction of the two dimension of extension of the flat shaped energy absorbing body 35. The transversally extending ribs 370 may also assist in achieving improved control during energy absorption, i.e. a more controlled straight-lined elongation than if without such transversal ribs 370. Preferably, each transversal rib 370, as do also each longitudinal rib 360, extends from a hub part 380. There is preferably a plurality of such hub parts 380 centrally positioned along the centre line C. Each hub part 380 preferably presents a larger part, i.e. has a larger area seen from above than the ribs 360, 370. The thickness of the ribs 360, 370 and the hub is preferably the same, and as a result the hub parts 380 will not rupture but instead the ribs 360 upon application of a force that exceeds the rupture level of the ribs 360.

Preferably there is arranged a curved transition zone at the periphery of the hub 380 extending between each transversal rib 370 and longitudinal rib 360 to safeguard that the ribs 360, 370 will rupture and not the hub part 380. As a consequence, the width W4 of each hub part 380 will preferably be larger than the width W2, W3 of the ribs 360, 370. However, it is evident for the skilled person that basically the intended function may also be achieved by having the hub in various forms, e.g. to have the same width as the ribs, 360, 370, e.g. W4=W3. The whole stabilizing control arrangement 360 extends substantially the same distance as each one of the energy absorbing body members 35', 35". Thanks to the arrangement a very stable and controlled function of the energy absorbing member 3 may be achieved. Firstly, the ribs 360, 370 will safeguard that no movement will occur between the attachment parts 30, 31 during normal use, i.e. when being used and not exceeding the predetermined rupture force level RF (e.g. 700N), i.e. a force level that cannot start to deform any of the ribs 360, 370. At exceeding such a level RF, firstly the longitudinal ribs 360 will break and thereafter the transversal ribs will be pushed together and bend and follow the hub portion 380. Thanks to this arrangement there will be a very controlled elongation during the consecutive rupture of the ribs 360 of the stabilising control device 36 until a larger force is applied that will start to be absorbed by elongation of the absorbing body members 35', 35".

Figure 3:
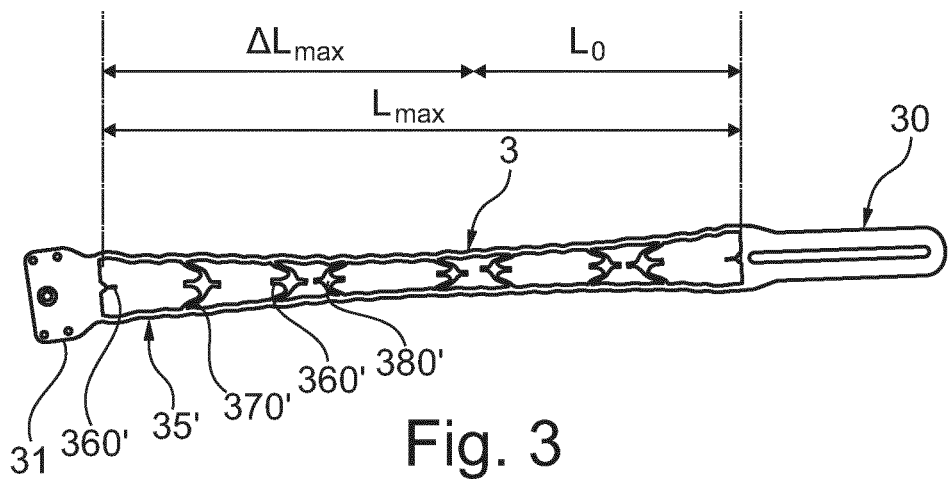
FIG. 3 shows a view from above of the embodiment of FIG. 4 after the total elongation.

In FIG. 3 there is shown an energy absorbing member 3 that has been applied to a force exceeding the predetermined force level F1 where it starts to elongate. As can be noted the shaped body 35 has prolonged at least the double length compared to the original length of the shaped body. As a consequence, the two S-shaped rows 35', 35" have turned into more or less straight-lined rows. Further, it is shown that all the longitudinal ribs 360 have ruptured and left fragments 360' of each longitudinal rib 360. Moreover, the transversally extending ribs 370 have been bent by the pressing forces that have been applied during elongation. The hub-shaped parts 380 have been moved relative to each other but in other aspects remained more or less undeformed. As can be noted the elongation has been performed in a controlled straight-line manner, which in many applications is a major advantage.

Figure 4:
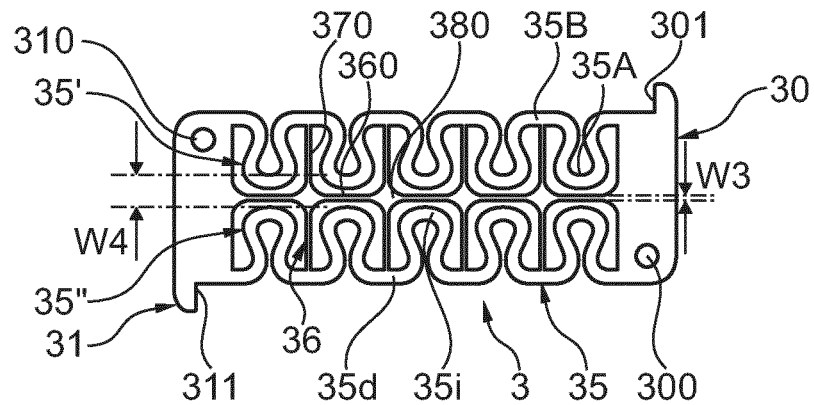
FIG. 4 shows a second embodiment according to the invention and, FIG. 5 shows a perspective view of the body members of FIGS. 2 and 4.

In FIG. 4 there is shown a fourth embodiment of an energy absorbing member 3 according to the invention where there is use of the same kind of shaped body 35 as also shown in FIGS. 2 and 3. Herein also two rows 35', 35" of a plurality of U-shaped portions 35A, 35B etc. are used to form two parallel rows including a plurality of S-shaped parts. Also, here there is arranged a stabilization control device 36 comprising longitudinal ribs 360 and transversal ribs 370 which emanate centrally from the hub part 380. Further, it is shown that the attachment devices 30, 31, as is an evident alternative, include both through holes 300, 310 and shoulders 301, 311 to fixedly position the energy absorbing member 3 within an arrangement.

Figure 5:
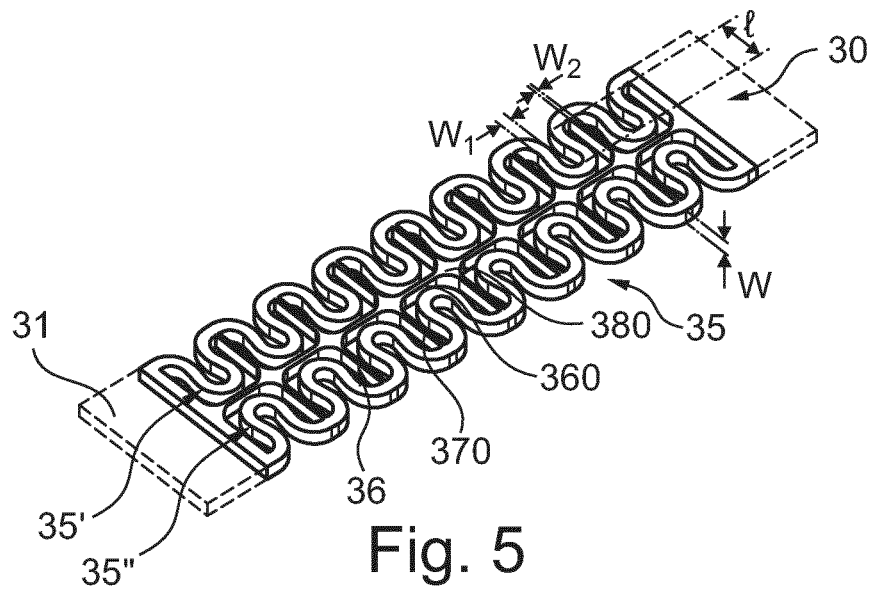

In FIG. 5 there is shown in a perspective view providing a more detailed presentation of a preferred energy absorbing shaped body 35, which is in substance is designed in the same manner as has been described above in relations to FIGS. 2 and 4. It is shown that preferably the thickness W of the plate material may be more or less the same as the width W1 of the shaped body parts 35, preferably W<W1≥2.5 W In FIGS. 2, 3, 4 and 5 it is shown that each transversal rib 370 has a substantial length l, i.e. a length l that is larger than the thickness W of the shaped body 35. Preferably the length l of each transversal rib 370 is at least two times, preferably 3-12 times larger than the thickness W of the shaped body 35. This is preferably achieved by having the outer end of each transversal rib 370 connected to a distal part 35d of each shaped body 35 in a configuration having two rows of parallelly extending mirror symmetric body members 35', 35". More preferred this is achieved by having the hub-shaped parts 380 positioned centrally in between distal parts 35d of two neighbouring mirror symmetric rows 35', 35", such that each pair of transversal ribs 370 having their inner ends connected to the hub part 380, when extending substantially obliquely in relation to the centre line C, will have their outer ends connected to a distal part 35d of each shaped body 35. Moreover, preferably the width W2, W3 of the ribs 360, 370 is such that the width W2 of the transversal ribs 370 is within the range of 0.5-2 times the width W3 of the longitudinally extending rib/s 360, e.g. in some embodiments having the same or substantially the same width W2, W3 for both ribs 360, 370.

In a most preferred embodiment, the minimum radius R at the inner curved surface of the bends of each S-shaped part body part is in the range of W≤R≤2.5 W. Further preferably the thickness W of the shaped body 35 may be within the range of 10 W≤$L_0$≤100 W of the nominal length $L_0$ of the shaped body 35, and the width W2, W3 of the ribs 360, 370 within the range of 0.05-0.8 of the thickness W of the shaped body 35.

It is foreseen that an energy absorbing member according to the invention may be used in a large variety of applications, e.g. different kind of security arrangements, e.g. for an assembly having a vehicle pushing a load wherein the security arrangement may eliminate rupture between a coupling between the pushing vehicle and the pushed load, e.g. a train pushing a wagon. In another exemplary application it may relate to a vehicle in the form of a moveable device in a machine which is arranged with a load stop assembly, wherein the security arrangement including such an energy absorbing member may eliminate rupture of the attachment between the ground and the stop member of the machine.

It is evident for the skilled person that the invention is not limited to what is described above but may be varied within the scope of the claims. The energy absorbing member 3 may be made of a at least partially plastically formable material, such as a metal, a foam or the like. For instance, it is evident that the energy absorbing member need not be planar but may be curved, in various manners, e.g. to be more or less tubular. Moreover, it is evident that the basic principles of the invention may also be used in connection with other loads than on top of the roof of a vehicle and in connection with other vehicles than cars, e.g. load carrying assemblies 5 on a flat bed of a truck or rail wagon, etc.

The invention claimed is:

1. Energy absorbing member for a load carrying, load pulling, load pushing or load stopping assembly comprising:
    first and second attachment devices;
    a shaped body member extending in a longitudinal direction (C) between said first and second attachment devices, the shaped body member comprising a pair of parallel body members extending in the longitudinal direction;
    wherein the shaped body member when applied to a force above a first force level (F1) is arranged to enable a predetermined relative elongation (ΔL) between said first and second attachment devices parallelly with said longitudinal direction (C) upon simultaneous absorption of energy reducing the risk of hazard in connection with sudden deceleration;
    wherein said absorbing member includes a stabilizing control arrangement that extends along the shaped body member arranged to stabilize the shaped body member in relation to forces not exceeding a first force level (F1) hindering relative movement between said attachment devices in at least said longitudinal direction (C);
    wherein said stabilizing control arrangement includes at least one longitudinally extending rib extending along a center line (C) between the pair of parallel of body members;
    wherein there is a longitudinally extending row of longitudinal ribs extending the whole distance between the first and second attachment devices;
    wherein there is arranged at least one pair of transversal ribs, connecting in between the longitudinal ribs and the pair of parallel body members; and
    wherein each transversal rib and each longitudinal rib extend from at least one hub part that is positioned along said center line (C).

2. The energy absorbing member according to claim 1, wherein each rib has a length (l) that is larger than the thickness (W) of the shaped body member.

3. The energy absorbing member according to claim 1, wherein each of the parallel body members includes a plurality of U-shaped portions, wherein two neighboring U-shaped portions will form at least one S-shaped part extending in said longitudinal direction (C).

4. The energy absorbing member according to claim 1, wherein the predetermined relative elongation comprises a maximal elongation ($\Delta L_{max}$) of said shaped body member from its nominal length ($L_0$) to a maximum length ($L_{max}$), wherein said maximal elongation ($\Delta L_{max}$) is at least 50% of its nominal length ($L_0$).

5. The energy absorbing member according to claim 1, wherein more than 50% of the energy being absorbed is ductile.

6. The energy absorbing member according to claim 1, wherein said shaped body member is flat shaped.

7. The energy absorbing member according to claim 1, wherein the rupture force (RF) of said ribs is substantially smaller than said first force level (F1).

8. The energy absorbing member according to claim 7, wherein said ribs are made of the same material as the shaped body member and that the largest cross sectional area (AR) of said longitudinally extending ribs is smaller than the smallest cross sectional area (AS) of the shaped body member, wherein preferably AS>2 AR.

9. The energy absorbing member according to claim 1, wherein there is arranged a curved transition zone at the periphery of said hub extending between each transversal rib and longitudinal rib.

10. The energy absorbing member according to claim 1, wherein there are arranged a plurality of pairs of transversal ribs connecting in between the longitudinally extending row of the longitudinal rib and the parallel body members, wherein there is arranged a plurality of hub parts positioned along said center line (C).

11. The energy absorbing member according to claim 1, wherein the shaped body member is formed by means of cutting or punching from a plate material.

12. The energy absorbing member according to claim 1, wherein said length (I) of each transversal rib is at least two times larger than the thickness (W) of the shaped body member.

13. The energy absorbing member according to claim 1, wherein each transversal rib has its outer end connected to a distal part of the shaped body member.

14. The energy absorbing member according to claim 1, wherein the width (W2) of each transversal rib is within the range of 0.5-2 times the width (W3) of said at least one longitudinally extending rib.

15. The energy absorbing member according to claim 3 3, wherein the minimum radius (R) at the inner curved surface of the bends of each S-shaped part body part is in the range of W≤R≤2.5 W.

16. The energy absorbing member according to claim 1, wherein each of the parallel body members includes a plurality of U-shaped portions, wherein two neighboring U-shaped portions will form at least one S-shaped part extending in said longitudinal direction (C), and wherein there are a plurality of S-shaped parts connected to each other in parallel with said longitudinal direction (C).

17. The energy absorbing member according to claim 1, wherein the predetermined relative elongation comprises a maximal elongation ($\Delta L_{max}$) of said shaped body member from its nominal length ($L_0$) to a maximum length ($L_{max}$), wherein said maximal elongation ($\Delta L_{max}$) is at least 100% of its nominal length ($L_0$).

18. The energy absorbing member according to claim 1, wherein the predetermined relative elongation comprises a maximal elongation ($\Delta L_{max}$) of said shaped body member from its nominal length ($L_0$) to a maximum length ($L_{max}$), wherein said maximal elongation ($\Delta L_{max}$) is at least 150% of its nominal length ($L_0$).

19. The energy absorbing member according to claim 1, wherein more than 50% of the energy being absorbed is in the form of permanent deformation of said energy absorbing member.

20. The energy absorbing member according to claim 7, wherein said ribs are made of the same material as the shaped body member and that the largest cross sectional area (AR) of said longitudinally extending ribs is smaller than the smallest cross sectional area (AS) of the shaped body member, wherein preferably AS>10 AR.

21. The energy absorbing member according to claim 1, wherein said length (I) of each transversal rib is 3-12 times larger than the thickness (W) of the shaped body member.

* * * * *